United States Patent [19]
Kramer et al.

[11] 3,720,944
[45] March 13, 1973

[54] SIGNAL SYSTEM FOR JAMMING DETECTION SYSTEMS UTILIZING SIGNAL CORRELATION

[75] Inventors: Stanley I. Kramer, Brightwaters; Gordon R. Larsen, Huntington Station, both of N.Y.

[73] Assignee: Fairchild Hiller Corporation, Germantown, Md.

[22] Filed: Dec. 1, 1960

[21] Appl. No.: 73,150

[52] U.S. Cl. ................................343/18 E, 325/132
[51] Int. Cl. ..............................................H04k 3/00
[58] Field of Search........250/17; 343/18 E; 325/132; 348/18 E

[56] References Cited

UNITED STATES PATENTS

| | | | |
|---|---|---|---|
| 2,253,975 | 8/1941 | Guanella | 250/17 |
| 2,658,992 | 11/1953 | Byrne | 343/18 |
| 2,908,812 | 10/1959 | Laurent | 343/17.1 |
| 2,935,604 | 5/1960 | Di Toro | 250/20.5 |

Primary Examiner—Carl D. Quarforth
Assistant Examiner—J. M. Potenza
Attorney—Michael W. York

[57] ABSTRACT

The invention provides for a method and apparatus for jamming detection systems employing signal correlation devices, wherein a jamming signal may be transmitted. The transmitted signal, which is susceptible of detection by remote detection systems, has a plurality of identical components, at least one of which is displaced in time relative to another. The amount of time displacement may be selectively adjusted or varied to produce false correlations in the remote detecting systems.

7 Claims, 3 Drawing Figures

INVENTORS.
STANLEY I. KRAMER
& GORDON R. LARSEN
BY
their ATTORNEYS 3,720,944

SIGNAL SYSTEM FOR JAMMING DETECTION SYSTEMS UTILIZING SIGNAL CORRELATION

The present invention relates to signal jamming, and, more particularly, to novel methods and apparatus for jamming detecting systems employing devices for correlating signals received from a remote object over different paths of propagation.

Various forms of detection systems for detecting an object, such as an aircraft, at an unknown location, by means of radiations radiated or reflected therefrom have been developed. Many of these systems, such as that disclosed in U.S. Pat. No. 2,837,738, determine the range and rate of closure to the object at the unknown location by detecting signals from that object which have traveled over different paths of propagation. For example, one signal may be received directly from the object whereas a second signal having substantially identical components travels over a longer propagation path in which the signal may be reflected from a surface such as the earth. The time delay between the signals is then used to compute the range and range closure rate.

In a passive system, the signals received may be any type of radiations which are detectable and have distinguishable characteristics, such as noise signals. Because of the random and unpredictable nature of noise signals, correlation techniques are utilized to determine the time delay or displacement between the signals which have traveled over different paths.

Since systems of this type are known, it is important that an aircraft, for example, passing over or near to areas, as to which its presence or position should remain unknown, be able to jam any likely detection systems or devices.

In accordance with the invention, there is provided a method and apparatus for jamming detection systems employing signal correlation devices, wherein a jamming signal may be transmitted which is susceptible of detection by remote detection systems and has a plurality of identical components, at least one of which is displaced in time relative to another. The amount of time displacement may be selectively adjusted or varied to produce false correlations in the remote detecting systems. Further confusion may be successfully created by utilizing a plurality of different delay means to produce a signal having several identical components, all of which are displaced in time relative to one another. In an alternative embodiment a signal delay means can be varied in a random fashion.

For a more complete understanding of the invention, reference may be had to the following detailed description taken in conjunction with the accompanying figures of the drawings, in which.

Figure 1:
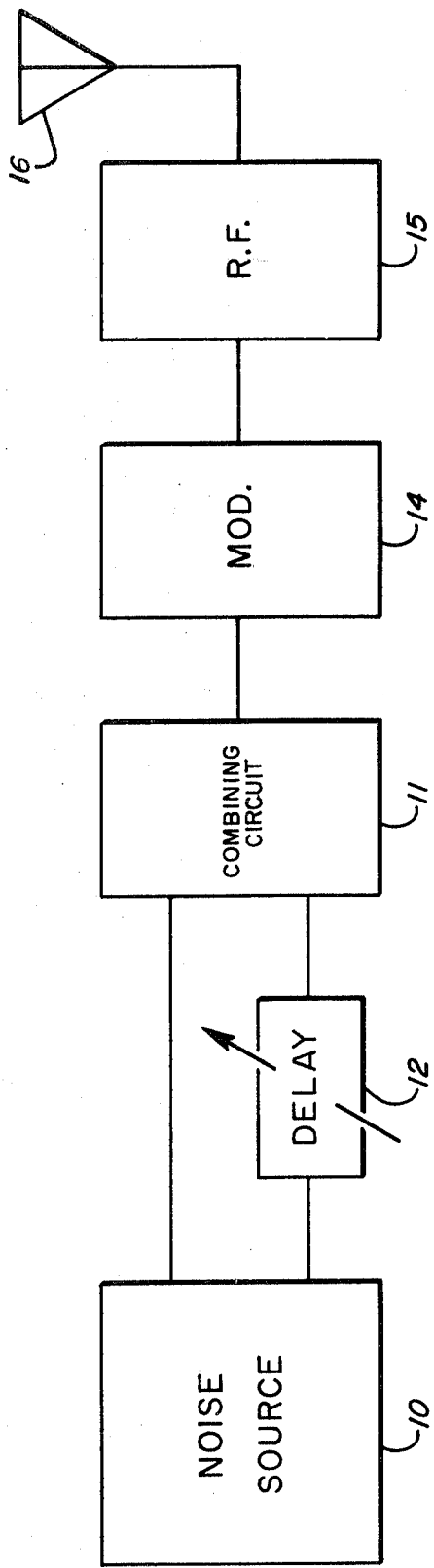
FIG. 1 is an electrical schematic block diagram illustrating an exemplary embodiment of the invention.
Figure 2:
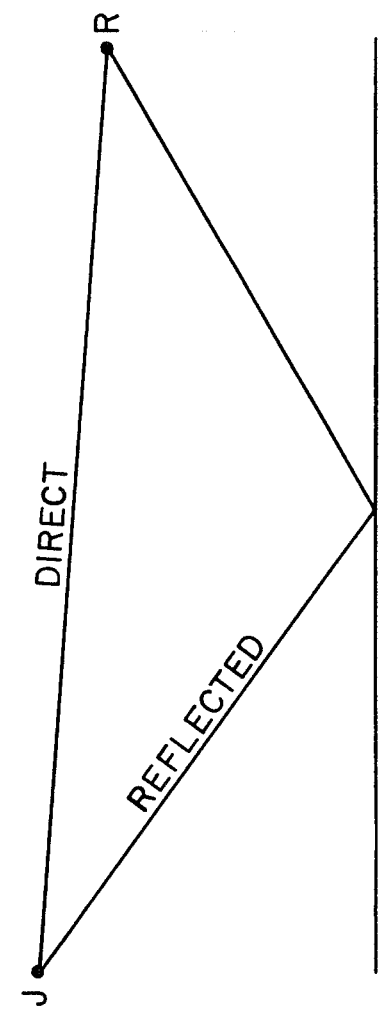
FIG. 2 is a diagrammatic showing of the propagation paths of signals emitting from a jamming point J and received by a detecting system at a point R.

In FIG. 1, a signal generating source 10 is provided, which may be of any conventional type capable of producing a signal, preferably a noise signal of random and varying characteristics. A combining means 11 is both directly coupled to the source 10 and indirectly coupled through a suitable variable delay means 12. The combining means 11 may take any suitable conventional form whereby an output signal is produced having a plurality of components representative of each of the different signals fed into it directly from the source 10 and indirectly through the delay means 12.

The output of the combining means 11 is then fed through suitable transmitting equipment such as a modulator 14 and radio frequency generating means 15 for transmission from an antenna 16, which may be mounted on an aircraft, for example.

Figure 3:
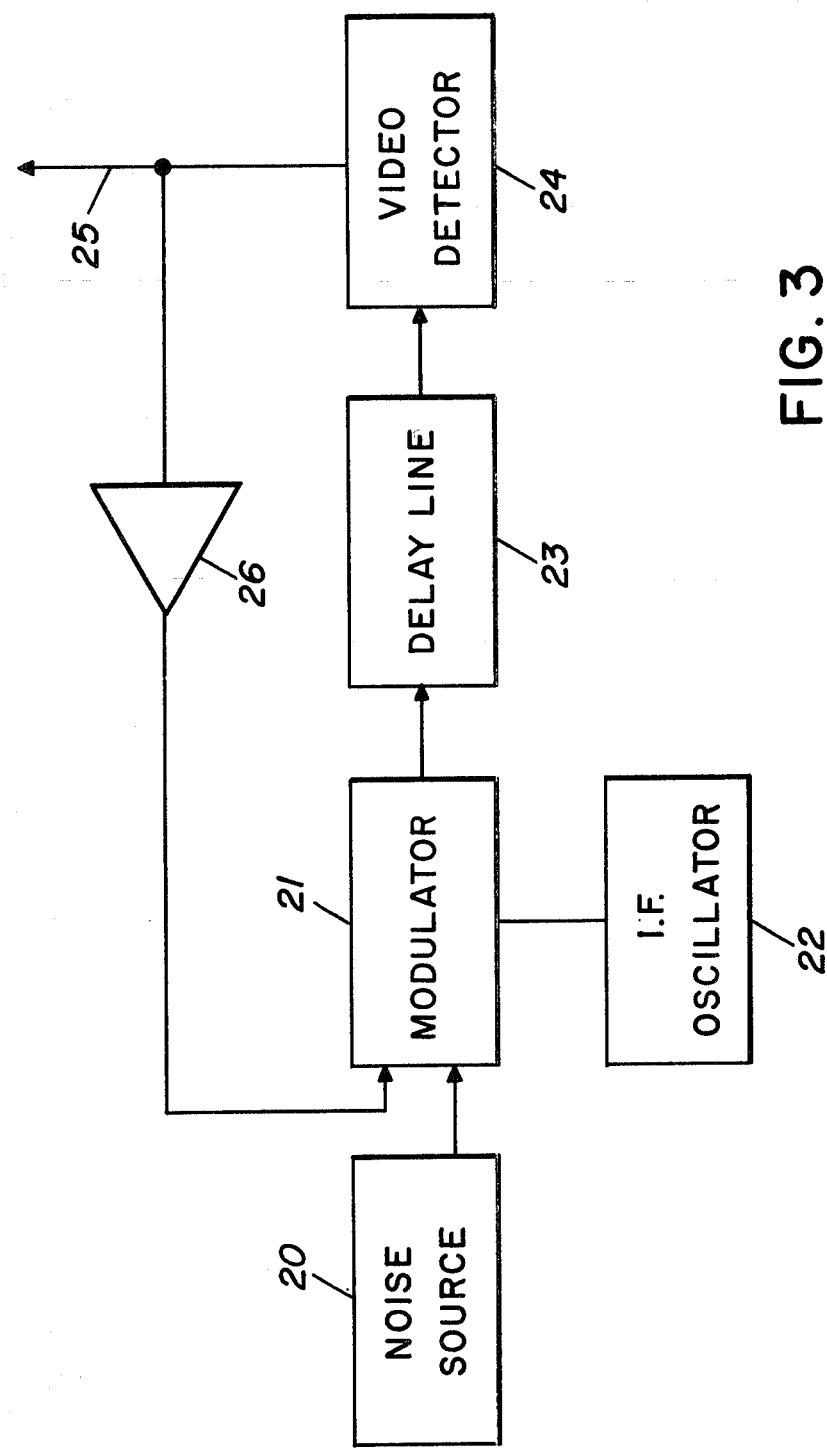
FIG. 3 is an electrical schematic block diagram illustrating a further exemplary embodiment of the invention.

In FIG. 3, a video source 20 of noise signals provides an output to a modulating means 21, which may take any suitable form, wherein the video noise signal is modulated with an intermediate frequency signal from a conventional I.F. oscillator 22 in order to place the noise signals in a frequency range suitable for transmission through a wide band delay means 23, which may take the form of a conventional quartz delay line. The output of the delay means 23 is then detected by a video detector means 24, the detected output 25 then being coupled to suitable transmitting equipment such as the modulator 14 and R.F. generating means 15 of FIG. 1.

The output of the video detector means 24 is also fed back through an amplifying means 26 to the input of the modulating means 21, so as to produce a plurality of noise signals having substantially identical components displaced in time relative to each other. The loop gain of the feedback circuit is less than unity so that the signal fed back will eventually die out.

Thus, there is provided a novel jamming method and apparatus, in accordance with the invention, which is capable of producing a jamming signal susceptible of reception by remote detection systems employing signal correlating devices, wherein the jamming signal has a plurality of identical components, at least one of which is displaced in time relative to another.

It will be obvious to those skilled in the art that the above described methods and embodiments are merely exemplary and are susceptible of modification and variation within the spirit and scope of the invention. For example, the variable delay means may be of the electrical delay or magnetostrictive delay type. The delay means may be varied either manually or in accordance with any conventional control technique. Further, a plurality of parallel delay means may be substituted for the delay means 12 to produce a plurality of time displaced signals displaced relative to each other and the direct signal from the noise signal generating source. Therefore, the invention is not deemed to be limited except as defined in the appended claims.

I claim:

1. A method of jamming detection systems employing devices for correlating signals received from a remote object over different paths of propagation, comprising the steps of producing a jamming signal having a plurality of substantially identical components which are respectively displaced in time relative to another by a factor $n \Delta t$, where $\Delta t$ is the delay time in seconds and $n$ is an integer, and transmitting said jamming signal to a remote detection system via direct and reflected paths.

2. A method for jamming detection systems employing devices for correlating noise signals received from a remote object over different paths of propagation, comprising the steps of generating a noise signal, selectively delaying said generated noise signal to produce a signal having substantially identical components with said generated noise signal but relatively displaced in time, and transmitting a jamming signal susceptible of reception by remote detection systems, said jamming signal including a signal representative of said generated noise signal and the selectively delayed noise signal.

3. A jamming system, comprising signal generating means for generating s given signal, means for selectively delaying respective components of said given signal by factor $n \, \Delta t$, where $\Delta t$ is the time delay in seconds and $n$ is an integer, means for combining said given signal and said delayed signal components to produce a jamming signal susceptible of reception by remote detection means and having a plurality of identical components, at least one of which is displaced in time relative to another by the factor $n \, \Delta t$.

4. A jamming system for jamming detection systems employing devices for correlating signals received from a remote object over different paths of propagation, comprising a noise signal generating means for producing a noise signal, delay means for delaying said noise signal to produce a delayed noise signal substantially identical with said given signal but relatively displaced in time, means for combining said noise signal and said delayed noise signal to produce a jamming signal, and means for transmitting said jamming signal at a frequency susceptible of reception by remote detection means, said jamming signal having a plurality of identical components, at least one of which is displaced in time relative to another.

5. A jamming system for jamming detection systems employing devices for correlating signals received from a remote object over different paths of propagation, comprising a noise signal generating means for producing a noise signal, delay means for delaying said noise signal to produce a delayed noise signal substantially identical with said given signal but relatively displaced in time, feedback means for feeding a portion of said delayed noise signal back through said delay means to produce in the output of said delay means a jamming signal having a plurality of substantially identical components displaced in time relative to one another, said feedback means and said delay means having a loop gain of less than unity, and means for transmitting said jamming signal at a frequency susceptible of reception by remote detection means.

6. A transmitting system for jamming receivers of the correlation type which correlate signals received from a remote signal radiating object via direct and reflected paths comprising means for generating a noise signal, means for delaying components of said noise signal by times $n \, \Delta t$ seconds, where $n$ is an integer and $\Delta t$ is the time delay of the delay means, means for combining said generated noise signal and said delayed components to produce a jamming signal, and means for transmitting said jamming signal.

7. A jamming system for jamming detection systems employing devices for correlating signals received from a remote object over different paths of propagation, comprising a noise signal generating means for producing a noise signal, delay means for delaying said noise signal to produce a delayed noise signal substantially identical with said given signal but relatively displaced in time, feedback means for feeding a portion of said delayed noise signal back through said delay means to produce in the output of said delay means a jamming signal having a plurality of substantially identical components displaced in time relative to one another, and means for transmitting said jamming signal at a frequency susceptible of reception by remote detection means.

* * * * *